(12) United States Patent
Ihara

(10) Patent No.: US 10,417,173 B2
(45) Date of Patent: Sep. 17, 2019

(54) PARALLEL PROCESSING APPARATUS AND NON-TRANSITORY COMPUTER-READABLE STORAGE MEDIUM

(71) Applicant: FUJITSU LIMITED, Kawasaki-shi, Kanagawa (JP)

(72) Inventor: Nobutaka Ihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/833,121

(22) Filed: Dec. 6, 2017

(65) Prior Publication Data

US 2018/0165245 A1    Jun. 14, 2018

(30) Foreign Application Priority Data

Dec. 8, 2016    (JP) .................................. 2016-238848

(51) Int. Cl.

| | |
|---|---|
| *G06F 15/173* | (2006.01) |
| *H04L 12/703* | (2013.01) |
| *H04L 12/707* | (2013.01) |
| *H04L 12/721* | (2013.01) |
| *H04L 12/24* | (2006.01) |
| *G06F 11/14* | (2006.01) |

(52) U.S. Cl.
CPC ........ *G06F 15/17312* (2013.01); *G06F 11/14* (2013.01); *G06F 15/173* (2013.01); *H04L 41/0654* (2013.01); *H04L 45/06* (2013.01); *H04L 45/22* (2013.01); *H04L 45/28* (2013.01)

(58) Field of Classification Search
CPC .... G06F 11/14; G06F 11/1423; G06F 15/173; G06F 15/17312; G06F 15/80; H04L 12/24; H04L 12/703; H04L 12/707; H04L 12/721; H04L 41/0654; H04L 45/06; H04L 45/22; H04L 45/28; H04L 43/0823
See application file for complete search history.

(56) References Cited

U.S. PATENT DOCUMENTS 5,161,156 A * 11/1992 Baum ................. G06F 11/0712
                                                              370/218
5,170,393 A * 12/1992 Peterson ................. H04L 45/06
                                                              370/255

(Continued)

FOREIGN PATENT DOCUMENTS

| JP | 5-265989 | 10/1993 |
|---|---|---|
| JP | 7-262146 | 10/1995 |

*Primary Examiner* — Tri H Phan
(74) *Attorney, Agent, or Firm* — Xsensus LLP

(57) ABSTRACT

A parallel processing apparatus including a plurality of compute nodes and a management node including a first processor configured to execute a process including collecting failure information regarding a plurality of ports of the plurality of compute nodes, and transmitting, to the plurality of compute nodes, failed port information including information on a failed port of the plurality of ports when an update in the failure information is detected in the collecting, wherein each of the plurality of compute nodes includes a second processor configured to execute a process including determining a retransmission route based on the failed port information when an inter-compute node communication in a low-level communication library has failed, and re-executing the inter-node communication by using the determined retransmission route.

5 Claims, 14 Drawing Sheets

(56) References Cited

U.S. PATENT DOCUMENTS

| | | | | |
|---|---|---|---|---|
| 5,303,383 | A | * | 4/1994 | Neches ................. G01J 3/06 370/351 |
| 5,321,813 | A | * | 6/1994 | McMillen ............. G01J 3/06 370/244 |
| 5,808,886 | A | | 9/1998 | Suzuki |
| 5,822,605 | A | * | 10/1998 | Higuchi ............ G06F 15/17381 712/11 |
| 6,543,014 | B1 | * | 4/2003 | Okuyama ............... H04L 45/20 370/412 |
| 7,516,320 | B2 | * | 4/2009 | Khan ................. G06F 15/7842 700/90 |
| 9,749,222 | B2 | * | 8/2017 | Inoue ................ G06F 15/17362 |
| 2017/0078222 | A1 | * | 3/2017 | Yamashita ............. H04L 43/16 |
| 2017/0126482 | A1 | * | 5/2017 | Jayaraman .......... H04L 41/0668 |
| 2018/0048518 | A1 | * | 2/2018 | Ihara .................. H04L 41/0654 |
| 2018/0159770 | A1 | * | 6/2018 | Nakagawa ............. H04L 45/26 |
| 2018/0212792 | A1 | * | 7/2018 | Brandt .................. G08C 19/00 |

\* cited by examiner

FIG. 5

```
node_id 011
vcoord 1,1,2
port_no 0
port_stat 2
node_id 006
vcoord 0,1,0
port_no 3
port_stat 2
```

FIG. 8

| NODE ID | DIRECTION |
|---------|-----------|
| 1 | Y+ |
| 2 | Y+ |
| 3 | Y+ |
| ⋮ | ⋮ |

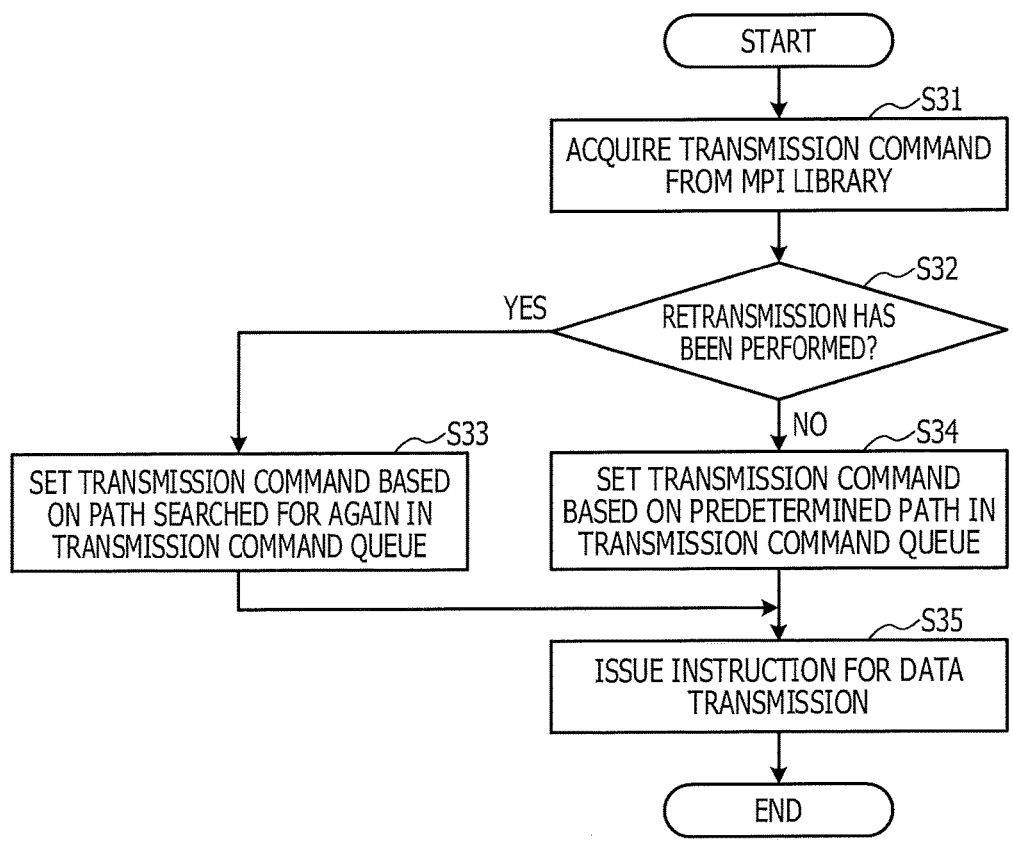

PARALLEL PROCESSING APPARATUS AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-238848, filed on Dec. 8, 2016, the entire contents of which are incorporated herein by reference.

FIELD

The embodiments discussed herein are related to a parallel processing apparatus and non-transitory computer-readable storage medium.

BACKGROUND

In high performance computing (HPC) where a plurality of compute nodes connected by a network execute a parallel program by cooperating with each other, communication paths are set so as to avoid passing through failed locations when a failed compute node and a failed path are known at the time when a job is assigned. However, if a communication path is interrupted during execution of a job, an issued communication command will not reach the transmission destination, a compute node, and thus the communication command is lost.

To address this issue, a communication command is retransmitted. For example, when communication is performed by using a message passing interface (MPI) library, since the MPI library performs communication via a low-level communication library at a lower layer, retransmission is performed by calling a transmission function and a reception-confirmation function of the low-level communication library a plurality of times.

In addition, there is a technique in which when it is notified from a destination processor that a reception buffer is not permitted to be used because of the occurrence of an error in the reception buffer, retransmission of data to be transmitted is stopped, and when it is notified that the reception buffer is in use, retransmission of data to be transmitted is performed at a predetermined timing. According to this technique, it is possible to inhibit meaningless repeats of retransmission.

There is also a technique in which when a failure occurs at the receiving destination, the correspondence between logical addresses and physical addresses of a conversion table for converting the logical address of the destination to the physical address is changed, dynamic reconfiguration processing of network routing is performed rapidly and effectively.

Japanese Laid-open Patent Publication No. 5-265989 and Japanese Laid-open Patent Publication No. 7-262146 are examples of the related art.

SUMMARY

According to an aspect of the invention, the parallel processing apparatus including a plurality of compute nodes and a management node including a first processor configured to execute a process including collecting failure information regarding a plurality of ports of the plurality of compute nodes, and transmitting, to the plurality of compute nodes, failed port information including information on a failed port of the plurality of ports when an update in the failure information is detected in the collecting, wherein each of the plurality of compute nodes includes a second processor configured to execute a process including determining a retransmission route based on the failed port information when an inter-compute node communication in a low-level communication library has failed, and re-executing the inter-node communication by using the determined retransmission route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a failure information file;

FIG. 8 is a diagram illustrating an example of information on a direction of transmission when a path searched for again is used;

FIG. 14 is a flowchart illustrating a flow of a process performed by a transmitting unit according to the second embodiment.

DESCRIPTION OF EMBODIMENTS

There is a problem in that if a transmission function and a reception-confirmation function of a low-level communication library are called a plurality of times in order to retransmit a communication command, it takes a long time to execute a parallel program.

The embodiments disclosed herein, for example, provide techniques for decreasing the execution time of a parallel program.

Hereinafter, embodiments of a parallel processing apparatus and an inter-node communication program disclosed in the present application will be described in detail with reference to the accompanying drawings. Note that the embodiments are not intended to limit the techniques disclosed herein.

First Embodiment

Figure 1:
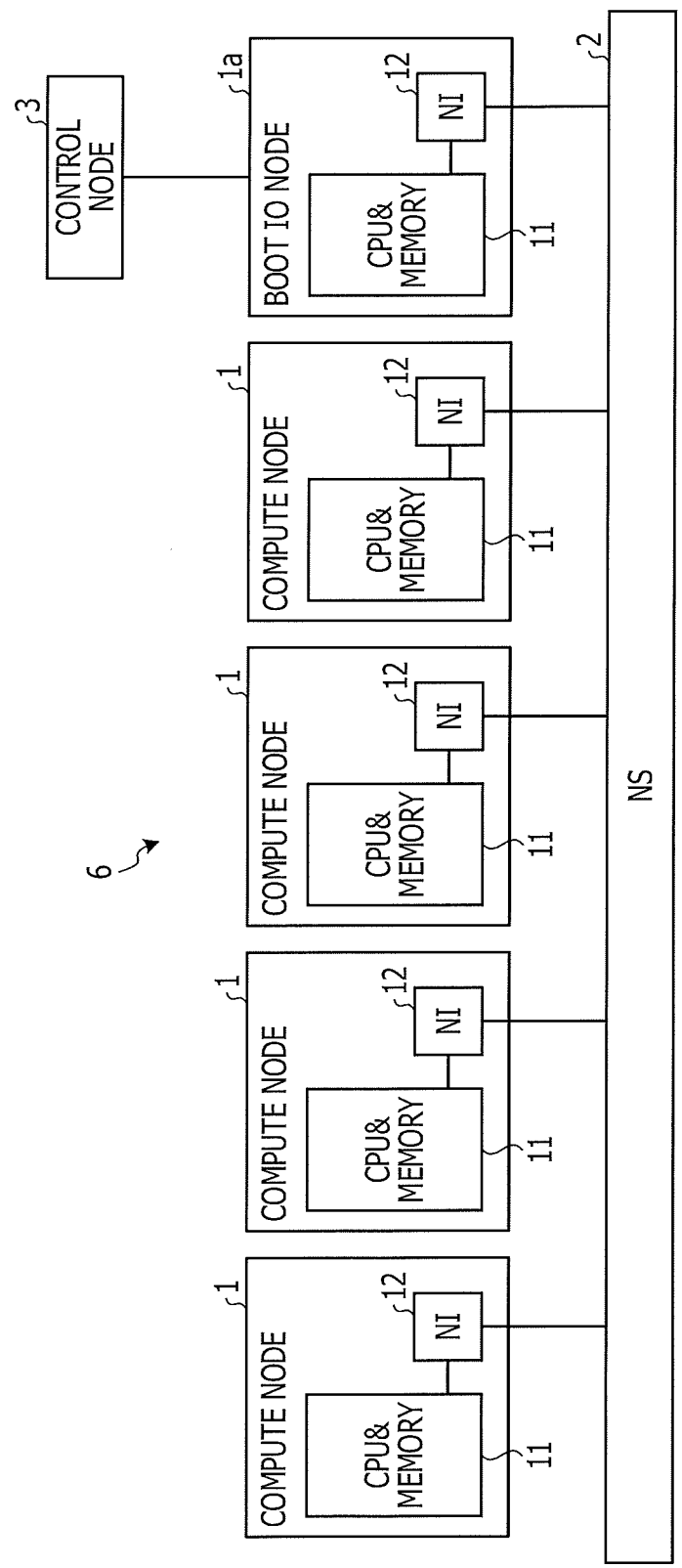
FIG. 1 is a diagram illustrating a configuration of a parallel processing apparatus according to a first embodiment.

First, the configuration of a parallel processing apparatus according to a first embodiment will be described. FIG. 1 is a diagram illustrating a configuration of a parallel processing apparatus 6 according to the first embodiment. As illustrated in FIG. 1, the parallel processing apparatus 6 includes four compute nodes 1, a boot-input/output (IO) node 1*a*, an NS 2, and a control node 3.

Although only four compute nodes 1 are illustrated in FIG. 1 for the sake of explanatory convenience, the parallel processing apparatus 6 includes more compute nodes 1. In addition, although the case where the compute nodes 1 are one-dimensionally arranged is illustrated, the compute nodes 1 are arranged in more dimensions, such as being two-dimensionally arranged or being three-dimensionally arranged. In addition, the compute nodes 1 may be arranged in a mesh configuration or may be arranged in a torus configuration. In addition, although only one boot-IO node 1*a* is illustrated in FIG. 1, the parallel processing apparatus 6 includes more boot-IO nodes 1*a*.

The compute node 1 is an information processing apparatus that executes a parallel program by cooperating with other compute nodes 1. The compute node 1 includes a central processing unit (CPU) & memory 11 and a network interface (NI) 12.

The CPU & memory 11 is composed of a CPU that reads a program from memory and executes the program and main memory that stores therein programs, intermediate execution results of programs, and the like. A program, for example, is stored in a digital versatile disc (DVD), is read from the DVD, and is installed in the compute node 1. Alternatively, a program is stored in a database or the like of a computer system coupled via a network, is read from the database or the like, and is installed in the compute node 1. Further, the installed program is stored in a hard disk drive (HDD), is read into main memory, and is executed by the CPU. The NI 12 is an interface for communication with another compute node 1 via the NS 2.

The boot-IO node 1*a* performs input of data to the compute node 1 and output of data from the compute node 1, and the like. The boot-IO node 1*a* is responsible for input and output of a predetermined number of compute nodes 1. The boot-IO node 1*a* includes the CPU & memory 11 and the NI 12. The boot-IO node 1*a* is coupled to the control node 3 and relays transmission and reception of data between the control node 3 and the compute node 1.

The NS 2 is a switch for coupling the compute nodes 1 and the boot-IO node 1*a*. The compute node 1 communicates with another compute node 1 or the boot-IO node 1*a* via the NS 2.

The control node 3 is a device that controls the parallel processing apparatus 6. The control node 3 is coupled to the boot-IO node 1*a*. The control node 3 monitors the compute nodes 1 and communication paths as will be described in detail below.

Figure 2:
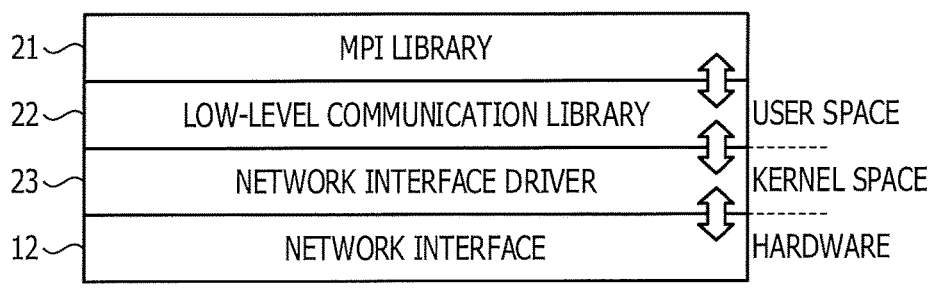
FIG. 2 is a diagram illustrating a hierarchy of components related to communication.

Next, the hierarchy of components related to communication will be described. FIG. 2 is a diagram illustrating a hierarchy of components related to communication. As illustrated in FIG. 2, an MPI library 21 is achieved by a low-level communication library 22. The low-level communication library 22 is software that runs in the user space.

The low-level communication library 22 communicates with the low-level communication library 22 of another compute node 1.

The low-level communication library 22 is achieved by a network interface driver 23. The network interface driver 23 is software that runs in the kernel space. The network interface driver 23 uses the NI 12 to communicate with the network interface driver 23 of another compute node 1.

Figure 3:
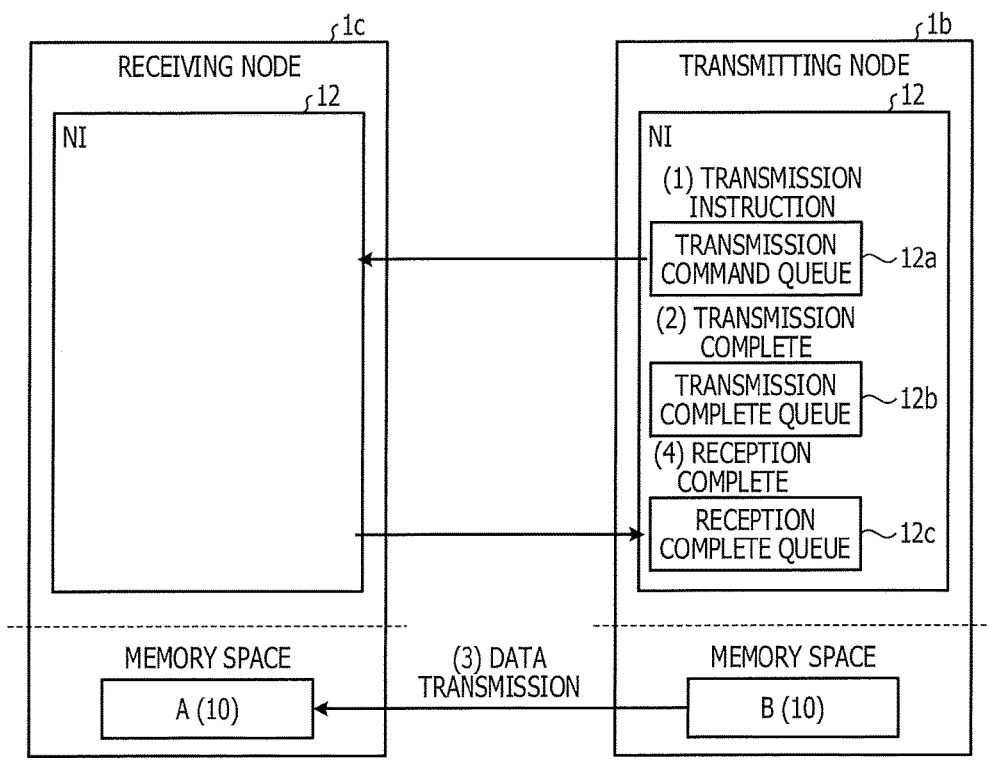
FIG. 3 is a diagram illustrating a relationship among a transmission command queue, a transmission complete queue, and a reception complete queue.

Next, the relationship among a transmission command queue, a transmission complete queue, and a reception complete queue will be described. FIG. 3 is a diagram illustrating a relationship among a transmission command queue, a transmission complete queue, and a reception complete queue. In FIG. 3, a transmitting node 1*b* is the transmitting compute node 1, and a receiving node 1*c* is the receiving compute node 1.

As illustrated in FIG. 3, the NI 12 includes a transmission command queue 12*a*, a transmission complete queue 12*b*, and a reception complete queue 12*c*. The low-level communication library 22 writes a transmission command passed from the MPI library 21 at a higher layer to the transmission command queue 12*a* to issue an instruction for transmission (1).

Upon executing the transmission command written to the transmission command queue 12*a*, the NI 12 sets a transmission complete notification in the transmission complete queue 12*b* (2). Further, when data is transmitted to the receiving node 1*c* on the other end of communication (3), a reception complete notification is set in the reception complete queue 12*c* (4). In FIG. 3, data B (10) of the transmitting node 1*b* is transmitted to A (10) of the receiving node 1*c*.

Figure 4:
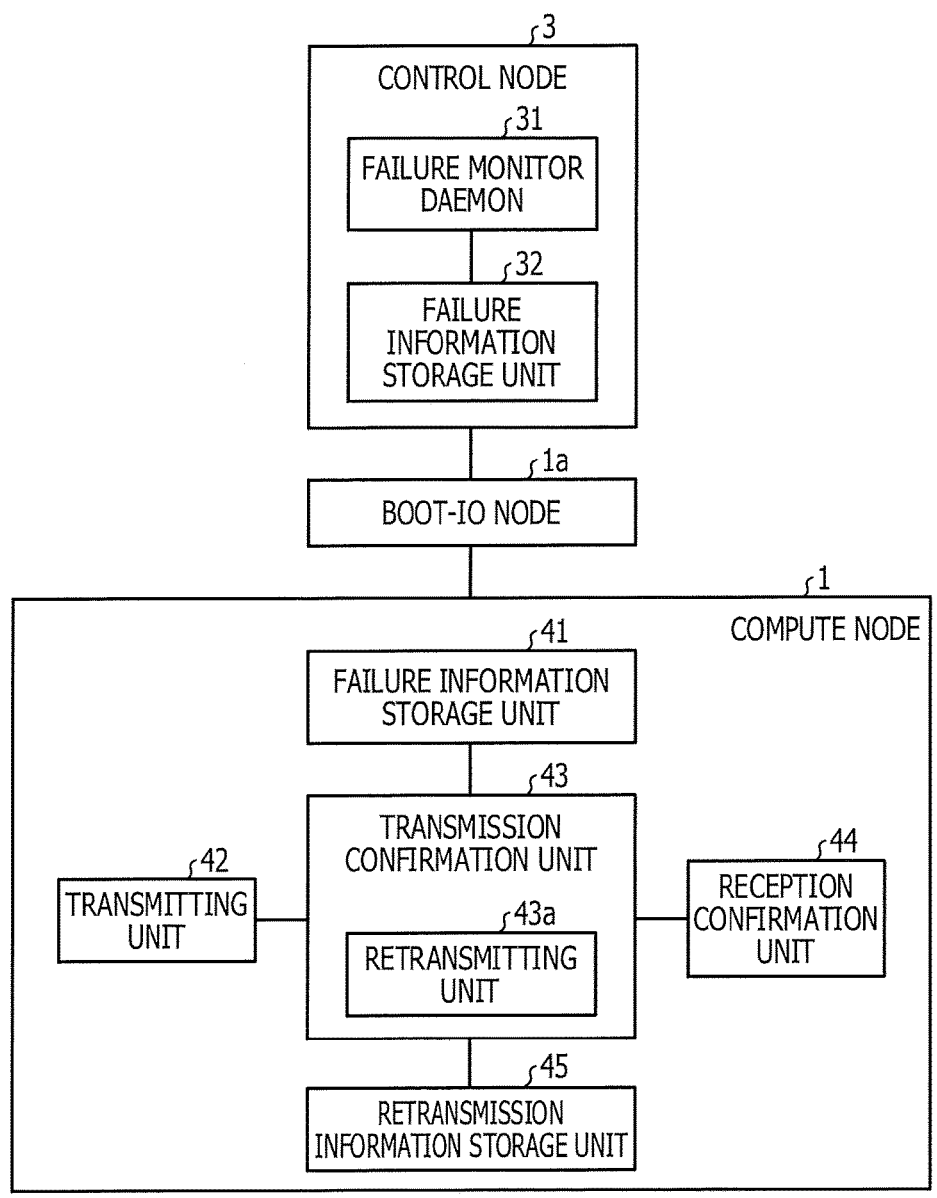
FIG. 4 is a diagram illustrating a functional configuration of a parallel processing apparatus.

Next, the functional configuration of the parallel processing apparatus 6 will be described. FIG. 4 is a diagram illustrating a functional configuration of the parallel processing apparatus 6. Note that although the functional configuration of one compute node 1 is illustrated in FIG. 4 for the sake of explanatory convenience, the other compute nodes 1 have the same functional configuration.

As illustrated in FIG. 4, the control node 3 includes a failure monitor daemon 31 and a failure information storage unit 32. The compute node 1 includes a failure information storage unit 41, a transmitting unit 42, a transmission confirmation unit 43, a reception confirmation unit 44, and a retransmission information storage unit 45. Note that the failure information storage unit 41, the transmitting unit 42, the transmission confirmation unit 43, the reception confirmation unit 44, and the retransmission information storage unit 45 are implemented as functions of the low-level communication library 22.

The failure monitor daemon 31 is a daemon that runs on the control node 3, checks the states of all of the compute nodes 1 and communication paths at regular time intervals, and creates a failure information file and writes the failure information file to the failure information storage unit 32 if a port failure has occurred.

The failure information storage unit 32 stores therein a failure information file. Information about a failed port is described in the failure information file. FIG. 5 is a diagram illustrating an example of a failure information file. As illustrated in FIG. 5, a note identifier (ID) (node_id), coordinate information (vcoord), a port number (port_no), and a port state (port_stat) are described for the failed compute node 1.

The node ID is an identifier identifying the compute node 1 where a failure has occurred. Coordinate information is the coordinates of the compute node 1 where a failure has occurred. For example, when the compute node 1 is arranged in three dimensions, the coordinate information is represented by x, y, and z. Here, x is a coordinate on the X-axis, y is a coordinate on the Y-axis, and z is a coordinate on the Z-axis; each of x, y, and z is an integer greater than or equal to zero.

The port number is the number of a port used for communication with the adjacent compute node 1. For example, when the compute node 1 is arranged in three dimensions, "0" corresponds to "Z+", "1" corresponds to "Z−", "2" corresponds to "X−", "3" corresponds to "X+", "4" corresponds to "Y−", and "5" corresponds to "Y+". Here, "+" indicates the positive direction of each axis, and "−" indicates the negative direction of each axis. For example, the port with a port number "0" is used when data is transmitted in the positive direction of the Z-axis.

The port state represents whether the port is in failure. For example, "1" indicates "a fatal hardware error of a router is detected", "2" indicates "a fatal hardware error of a port router is detected", and "3" indicates "an alarm for a hardware error is detected".

For example, the compute node 1 with a node ID "011" has coordinates (1, 1, 2), and a port used when data is transmitted in the positive direction of the Z-axis is in a state where "a fatal hardware error of a port router is detected".

Figure 6:
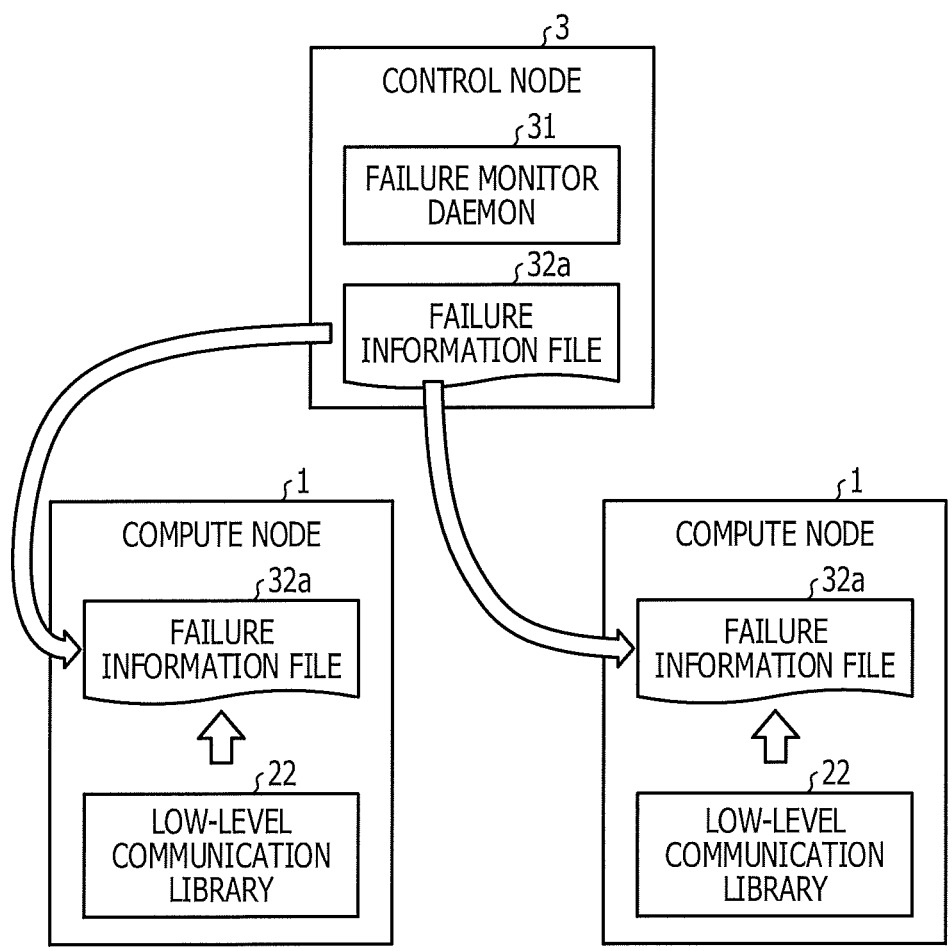
FIG. 6 is a diagram illustrating distribution of a failure information file.

Upon updating a failure information file, the failure monitor daemon 31 distributes the failure information file to all of the compute nodes 1. FIG. 6 is a diagram illustrating distribution of a failure information file. As illustrated in FIG. 6, the failure monitor daemon 31, for example, checks the states of all of the compute nodes 1 every one minute and creates a failure information file 32a. Further, upon updating the failure information file 32a, the failure monitor daemon 31 distributes the failure information file 32a to all of the compute nodes 1. The failure information file 32a is used by the low-level communication library 22.

The failure information storage unit 41 stores therein the failure information file 32a. Upon receiving a transmission command from the MPI library 21, the transmitting unit 42 writes the transmission command to the transmission command queue 12a for execution. When the transmission command written to the transmission command queue 12a is executed by the NI 12, the NI 12 writes a transmission completion notification to the transmission complete queue 12b.

The transmission confirmation unit 43 confirms that the transmission completion notification has been written to the transmission complete queue 12b. Then, the transmission confirmation unit 43 verifies whether a reception completion notification has been written to the reception complete queue 12c. The transmission confirmation unit 43 verifies a receipt completion notification corresponding to the transmission command of the transmission command queue 12a. Upon confirming a receipt completion notification corresponding to the transmission command, the transmission confirmation unit 43 passes a transmission completion to the MPI library 21.

Otherwise, if a reception completion notification is not able to be confirmed after a certain time period has elapsed since a transmission command was written to the transmission command queue 12a, the transmission confirmation unit 43 determines that a failure has occurred and performs retransmission processing. The transmission confirmation unit 43 includes a retransmitting unit 43a, and the retransmitting unit 43a performs retransmission processing.

The retransmitting unit 43a acquires the failure information file 32a and rebuilds a path by using the failure information file 32a. At this point, the retransmitting unit 43a searches again for paths from its compute node 1 to all of the other compute nodes 1. The retransmitting unit 43a then retransmits data by using the rebuilt path. The retransmitting unit 43a then stores, in the retransmission information storage unit 45, information indicating that data has been retransmitted and information on the directions of transmission in the case of using the paths searched for again.

Figure 7:
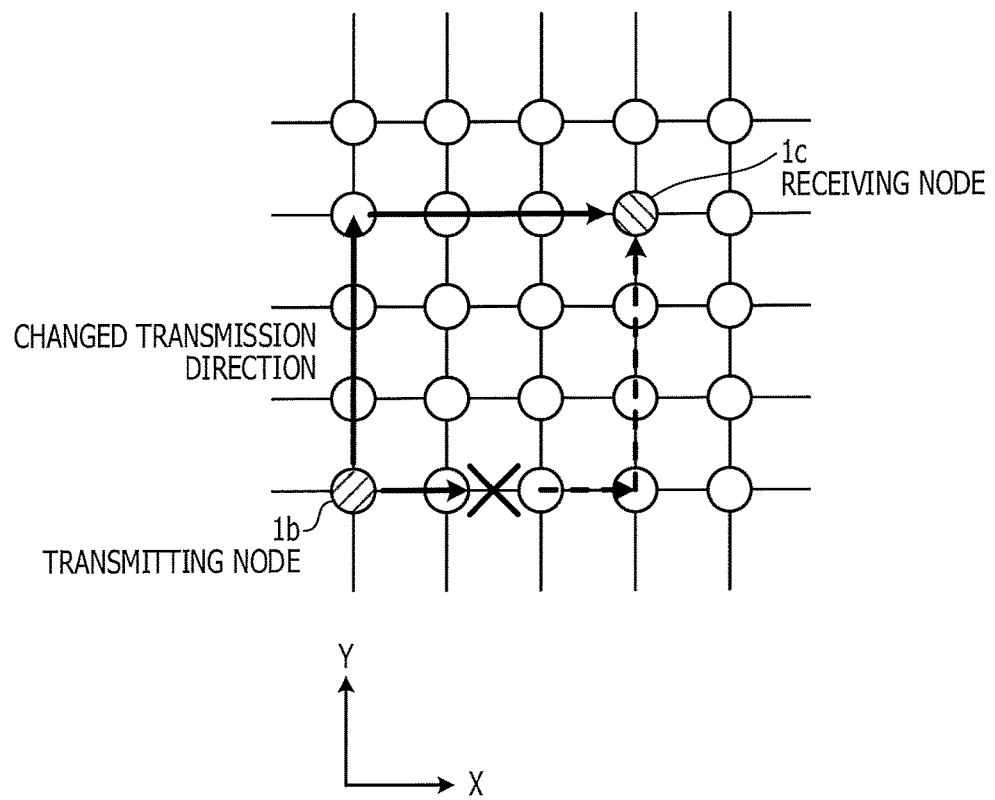
FIG. 7 is a diagram illustrating a path change at the time of retransmission.

FIG. 7 is a diagram illustrating a path change at the time of retransmission. As illustrated in FIG. 7, the transmitting node 1b transmits data to the compute node 1 adjacent in the positive direction of the X-axis, thereby transmitting the data to the receiving node 1c. At this stage, if a failure has occurred in the path, the retransmitting unit 43a of the transmitting node 1b recalculates a route to an adjacent node, the transmission destination, by using the failure information file 32a. In the example illustrated in FIG. 7, the compute node 1 adjacent in the positive direction of the Y-axis is specified as the transmission destination by recalculating the route. Then, the retransmitting unit 43a retransmits data to the compute node 1 adjacent in the positive direction of the Y-axis.

Which direction of the positive and negative directions of the X-axis and the positive and negative directions of the Y-axis is the direction in which data is to be transmitted is designated by a transmission command. In addition, the transfer path of data is determined by the transmission direction. For example, data transferred in the positive direction of the Y-axis is transferred to the compute node 1 having the same y-coordinate as the receiving node 1c, and then is transferred in the positive direction of the X-axis to arrive at the receiving node 1c. There are two paths in the case of two-dimensional mesh arrangement, while there are four paths in the case of two-dimensional torus arrangement.

The reception confirmation unit 44 notifies the MPI library 21 of reception completion when it is confirmed that a reception completion notification has been written to the reception complete queue 12c.

Figure 8:
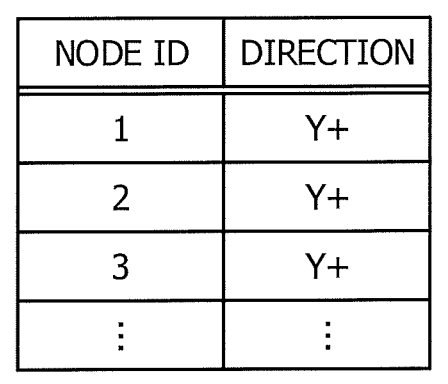

The retransmission information storage unit 45 stores therein information indicating whether retransmission has been performed and information on the directions of transmission using paths searched for again by the retransmitting unit 43a. FIG. 8 is a diagram illustrating an example of information on directions of transmission in the case of using paths searched for again. FIG. 8 illustrates the case where the compute node 1 having a node ID of zero is the transmitting node.

As illustrated in FIG. 8, the information on the direction of transmission in the case of using communication paths searched for again includes node IDs and directions. The node ID is an identifier of the destination compute node 1. The direction is the direction of transmission in the case where data is transmitted to the corresponding compute node 1, and is any of the "X+", "X−", "Y+", and "Y−" when two-dimensional torus arrangement is used. For example, when data of the compute node 1 having a node ID "1" is transmitted, the data is transmitted in the + direction of the Y-axis.

Figure 9:
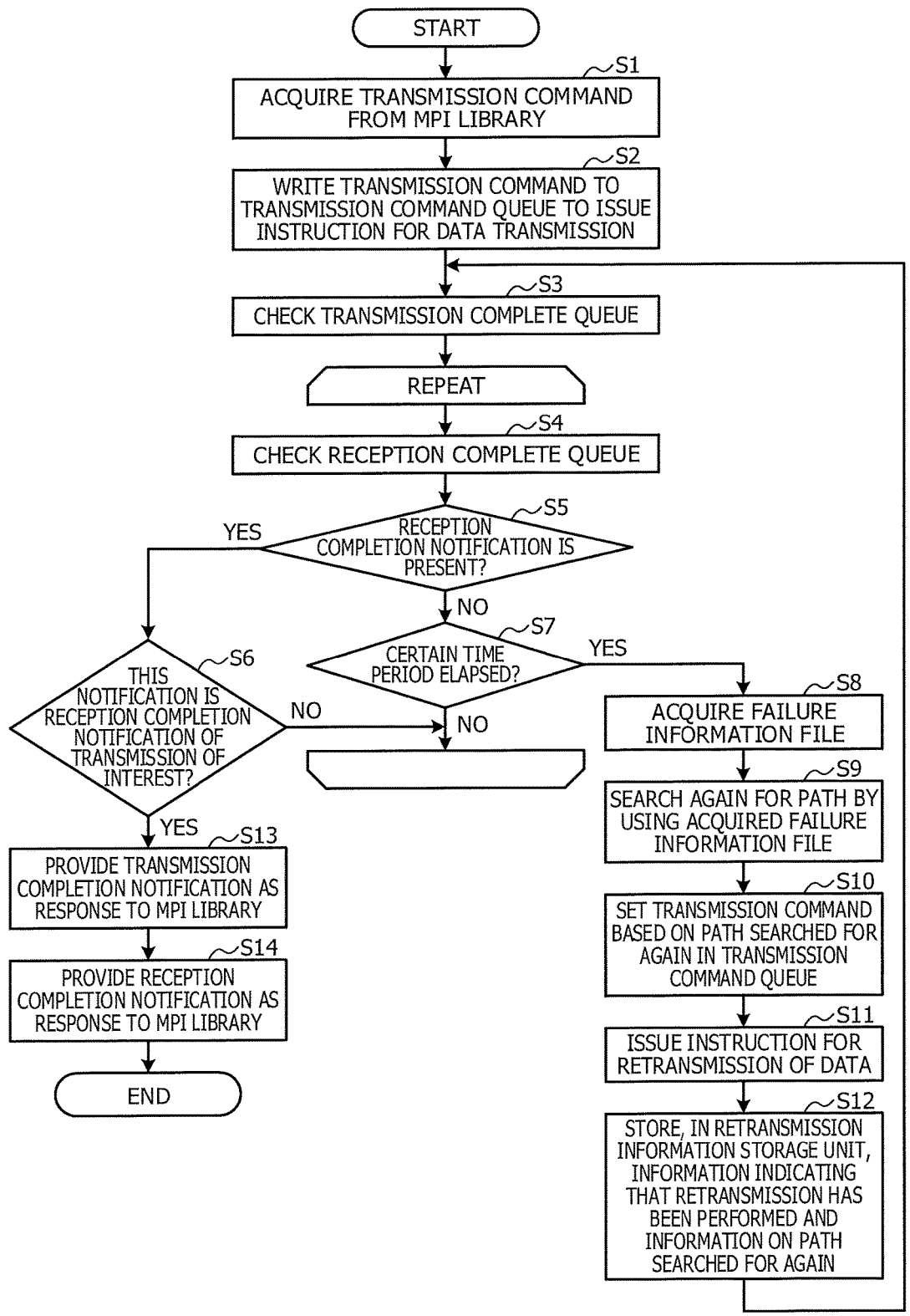
FIG. 9 is a flowchart illustrating a flow of a transmission process.

Next, the flow of transmission processing will be described. FIG. 9 is a flowchart illustrating a flow of transmission processing. As illustrated in FIG. 9, upon acquiring a transmission command from the MPI library 21 (step S1), the low-level communication library 22 writes the transmission command to the transmission command queue 12a to issue an instruction for data transmission (step S2).

Further, the low-level communication library 22 checks the transmission complete queue 12b (step S3) and repeats step S4 to step S7 until the condition of step S6 or step S7 is satisfied. That is, the low-level communication library 22 checks the reception complete queue 12c (step S4) and determines whether a reception completion notification is present (step S5).

If a reception completion notification is present, the low-level communication library 22 determines whether the reception completion notification is a reception completion notification of the transmission of interest (step S6) and proceeds to step S13 if the reception completion notification is a reception completion notification of the transmission of interest. Otherwise, if the reception completion notification is not a reception completion notification of the transmission of interest, the low-level communication library 22 returns to step S4. In addition, if no reception completion notification is present, the low-level communication library 22 determines whether a certain time period has elapsed after transmission (step S7) and returns to step S4 if the certain time period has not elapsed.

Otherwise, if the certain time period has elapsed, the low-level communication library 22 acquires the failure information file 32a (step S8) and searches again for a path by using the acquired failure information file 32a (step S9). Further, the low-level communication library 22 sets a transmission command based on the path searched for again in the transmission command queue 12a (step S10) and issues an instruction for retransmission of data (step S11). Further, the low-level communication library 22 stores, in the retransmission information storage unit 45, information indicating that retransmission has been performed and information on the path searched for again (step S12) and returns to step S3.

If, in step S6, the notification is a reception completion notification of the transmission of interest, the low-level communication library 22 provides a transmission completion notification as a response to the MPI library 21 (step S13) and then provides a reception completion notification as a response to the MPI library 21 (step S14).

In this way, when a certain time period has elapsed after transmission of data, the low-level communication library 22 searches for a path again by using the failure information file 32a and retransmits data by using the path searched for again. This may make it unnecessary for the MPI library 21 to perform retransmission.

Note that the process of step S1 to step S2 is a process executed by the transmitting unit 42 that copes with a transmission function of the low-level communication library 22. The process of step S1 to step S13 is a process executed by the transmission confirmation unit 43. The process of step S14 is a process executed by the reception confirmation unit 44.

Figure 10:
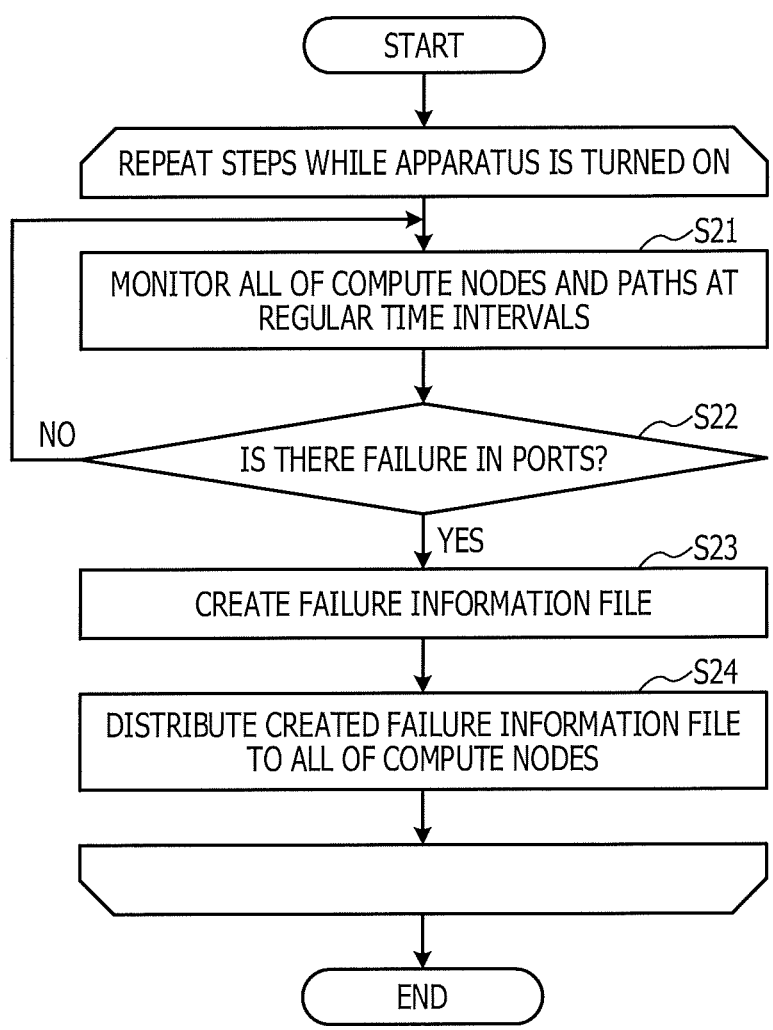
FIG. 10 is a flowchart illustrating a flow of a process of creating a failure information file.

Next, the flow of a process of creating the failure information file 32a will be described. FIG. 10 is a flowchart illustrating a flow of a process of creating the failure information file 32a. As illustrated in FIG. 10, the failure monitor daemon 31 repeats step S21 to step S24 while the parallel processing apparatus 6 is turned on.

That is, the failure monitor daemon 31 monitors all of the compute nodes 1 and paths at regular time intervals (step S21) and determines whether there is a failure in ports (step S22). If there is no failure in ports, the failure monitor daemon 31 returns to step S21.

Otherwise, if there is a failure in ports, the failure monitor daemon 31 creates the failure information file 32a (step S23) and distributes the created failure information file 32a to all of the compute nodes 1 (step S24).

In this way, the failure monitor daemon 31 creates and distributes the failure information file 32a to all of the compute nodes 1, enabling each compute node 1 to search again for communication paths.

As described above, according to the first embodiment, the failure monitor daemon 31 monitors the compute nodes 1 and paths at regular time intervals and, if a port failure is detected, creates and distributes the failure information file 32a to all of the compute nodes 1. Further, if the low-level communication library 22 is not notified of completion of data reception even after a certain time period has elapsed since the data was transmitted, the low-level communication library 22 searches again for a path by using the failure information file 32a and retransmits data by using the path searched for again. Accordingly, retransmission performed by the MPI library 21 may be made unnecessary, and thus the time for execution of a parallel program may be decreased.

According to the first embodiment, when the transmission confirmation unit 43 is not notified of completion of data reception, the transmission confirmation unit 43 searches again for a path by using the failure information file 32a and retransmits data by using the path searched for again. Accordingly, the MPI library 21 may be inhibited from being notified of transmission completion before reception completion is confirmed.

According to the first embodiment, since the failure file 32a includes a node ID, coordinate information, a port number, and a port state, the low-level communication library 22 may search again for a path that does not use a failed port.

It is to be noted that although the case where the low-level communication library 22 searches again for a path by using the failure information file 32a has been described in the first embodiment, the present disclosure is not limited to this and may be applied in a similar manner to the case where the path search is delegated to an external path search program.

Second Embodiment

According to the first embodiment described above, the transmission confirmation unit 43 stores, in the retransmission information storage unit 45, information on a path searched for by using the failure information file 32a. This information is available not only at the time when data is retransmitted but also at the time when data is transmitted for the first time. if this information is not used, a timeout sometimes occurs in transmitting data to another receiving node 1c. When there are a large number of receiving nodes each having a possibility of becoming the receiving node 1c in such a situation, a problem lies in that the duration of timeout is multiplied.

Figure 11:
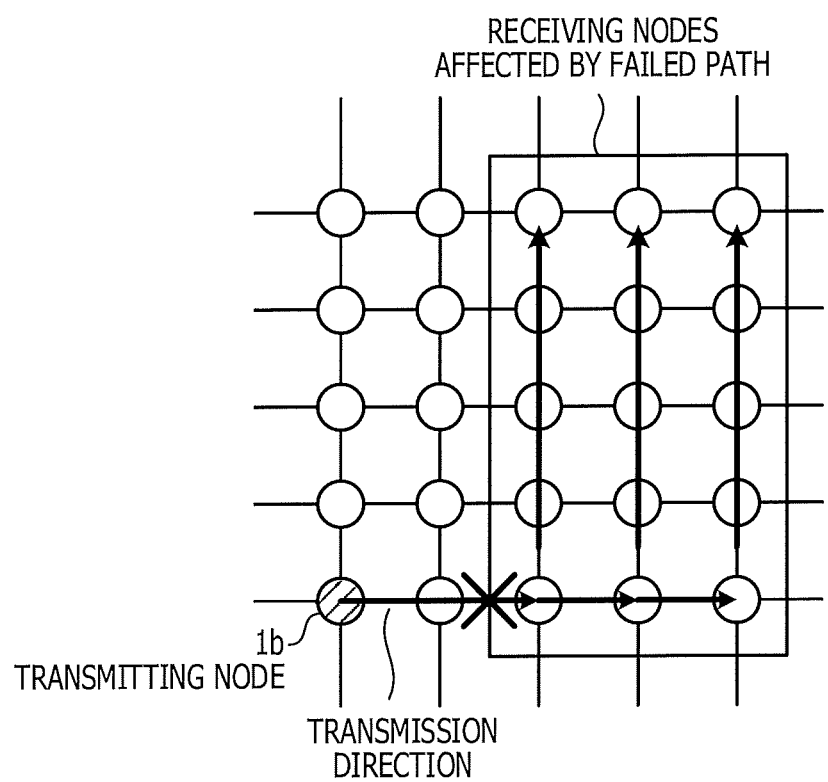
FIG. 11 is a diagram illustrating multiplication of timeout duration.

FIG. 11 is a diagram illustrating multiplication of timeout duration. In the example illustrated in FIG. 11, when any of 15 compute nodes 1 surrounded by a box becomes the receiving node 1c, timeout occurs and the duration of timeout is multiplied. This increases the execution time of a parallel program. For example, assuming that the duration of timeout is one minute and the number of compute nodes 1 affected by the path failure is 50, the parallel program will stop running for a maximum of 50 minutes.

Figure 12:
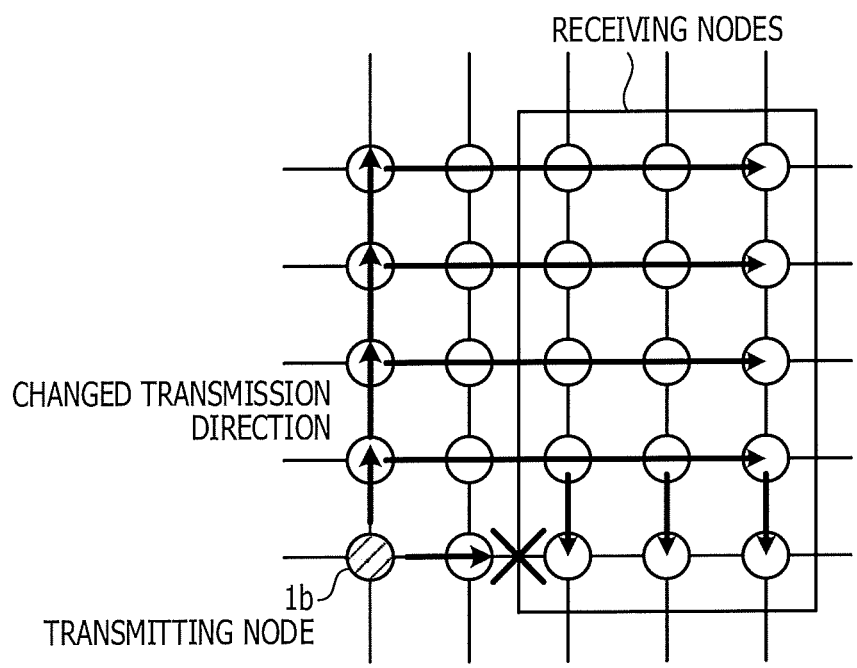
FIG. 12 is a diagram illustrating a resolution to a problem of multiplication of timeout duration.

However, using information in the retransmission information storage unit 45 from the first data transmission may resolve the problem of multiplication of the timeout duration. FIG. 12 is a diagram illustrating a resolution to a problem of multiplication of timeout duration. As illustrated in FIG. 12, when any of the compute nodes 1 surrounded by a box is the receiving node 1c, the transmitting node 1b uses information in the retransmission information storage unit 45 to change the direction in which data is to be transmitted. Accordingly, retransmission of data is unnecessary when any of the compute nodes 1 surrounding by a box is assumed to be the receiving node 1c, and thus the problem of multiplication of the timeout duration may be resolved.

Figure 13:
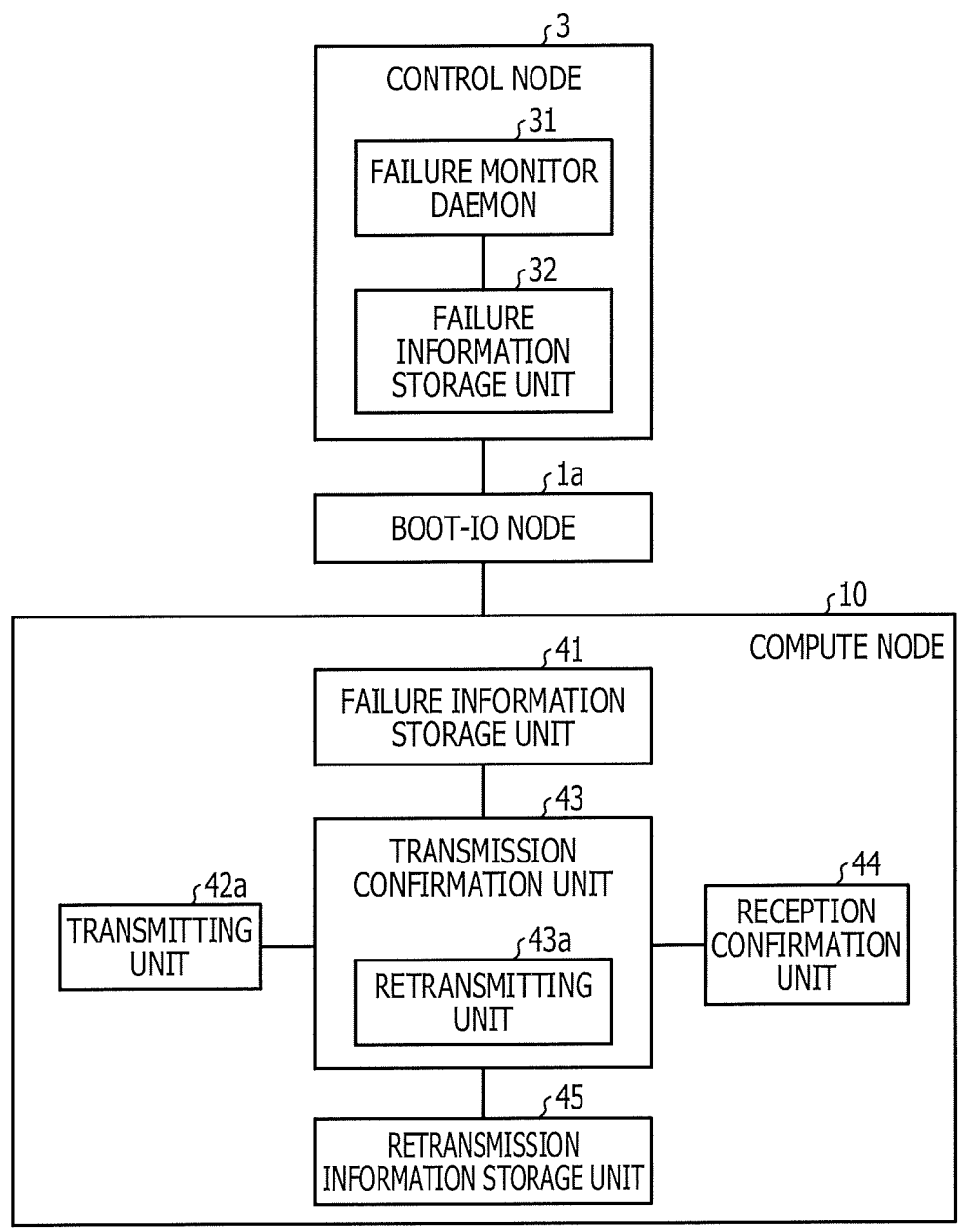
FIG. 13 is a diagram illustrating a functional configuration of a parallel processing apparatus according to a second embodiment.

Therefore, in the second embodiment, a low-level communication library that transmits data by using information in the retransmission information storage unit 45 will be described. FIG. 13 is a diagram illustrating a functional configuration of a parallel processing apparatus according to the second embodiment.

For the sake of explanatory convenience, here, functional components that fulfil roles similar to those of the components illustrated in FIG. 4 are denoted by the same reference numerals and the detailed description thereof is omitted. As illustrated in FIG. 13, the compute node 10 according to the second embodiment includes a transmitting unit 42a instead of the transmitting unit 42 as compared to the compute node 1 illustrated in FIG. 4. The transmitting unit 42a refers to information in the retransmission information storage unit 45 when performing transmission, and transmits data by using transmission information stored in the retransmission information storage unit 45 if retransmission has been performed.

FIG. 14 is a flowchart illustrating a flow of a process performed by the transmitting unit 42a according to the second embodiment. As illustrated in FIG. 14, the transmitting unit 42a acquires a transmission command from the MPI library 21 (step S31) and, by reference to information in the retransmission information storage unit 45, determines whether retransmission has been performed (step S32).

If retransmission has been performed, the transmitting unit 42a sets a transmission command based on a path searched for again in the transmission instruction queue 12a (step S33) and, if not, sets a transmission command based on a predetermined path in the transmission command queue 12a (step S34). The transmitting unit 42a then issues an instruction for transmitting data (step S35).

As described above, according to the second embodiment, the transmitting unit 42a changes the direction of transmission by using information in the retransmission information storage unit 45. This may reduce retransmission between the compute nodes 1.

It is to be noted that the case where the low-level communication library 22 changes the direction of transmission by using information in the retransmission information storage unit 45 has been described in the second embodiment; however, the present disclosure is not limited to this and may be applied in a similar manner to the case where, for example, the MPI library 21 issues an instruction for a transmission direction by using information in the retransmission information storage unit 45.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel processing apparatus, comprising:
a plurality of compute nodes; and
a management node including a first processor configured to:
collect failure information regarding a plurality of ports of the plurality of compute nodes by checking the compute nodes at intervals of a predetermined period; and
transmit, to the plurality of compute nodes, failed port information including information on a failed port of the plurality of ports when an update in the failure information is detected, wherein
each of the plurality of compute nodes includes a second processor configured to:
determine a retransmission route based on the failed port information when an inter-compute node communication has failed; and
re-execute the inter-node communication by using the determined retransmission route.

2. The parallel processing apparatus according to claim 1, wherein the second processor of each of the plurality of compute nodes is configured to perform the determine and the re-execute in a process of verifying completion of transmission.

3. The parallel processing apparatus according to claim 1, wherein the failed port information includes;
a node identifier of the plurality of compute nodes,
coordinate information indicating coordinates of each of the plurality of compute nodes in a parallel processing executed by the parallel processing apparatus,
a port identifier of the plurality of ports used for data communication to an adjacent compute node, and
state information that indicates a state of the plurality of ports.

4. A non-transitory computer-readable storage medium storing a program that causes a parallel processing apparatus to execute a process, the parallel processing apparatus including a plurality of compute nodes, the process comprising:
collecting failure information regarding a plurality of ports of the plurality of compute nodes by checking the compute nodes at intervals of a predetermined period;
transmitting, to the plurality of compute nodes, failed port information including information on a failed port of the plurality of ports when an update in the failure information is detected in the collecting;
causing at least one of plurality of compute nodes to determine a retransmission route based on the failed port information when an inter-compute node communication has failed; and
causing the at least one of plurality of compute nodes to re-execute the inter-node communication by using the determined retransmission route.

5. A parallel processing method executed by parallel processing apparatus including a plurality of compute nodes, the parallel processing method comprising:
collecting failure information regarding a plurality of ports of the plurality of compute nodes by checking the compute nodes at intervals of a predetermined period;
transmitting, to the plurality of compute nodes, failed port information including information on a failed port of the plurality of ports when an update in the failure information is detected in the collecting;

determining, by at least one of plurality of compute nodes, a retransmission route based on the failed port information when an inter-compute node communication has failed; and re-executing, by at least one of plurality of compute nodes, the inter-node communication by using the determined retransmission route.

* * * * *